US012757239B2

(12) United States Patent
Liu

(10) Patent No.: US 12,757,239 B2
(45) Date of Patent: Oct. 6, 2026

(54) INTERFERENCE SUPPRESSION METHOD AND APPARATUS, STORAGE MEDIUM, AND ELECTRONIC DEVICE

(71) Applicant: ZTE CORPORATION, Shenzhen (CN)

(72) Inventor: Caifang Liu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 188 days.

(21) Appl. No.: 18/861,949

(22) PCT Filed: Jan. 18, 2023

(86) PCT No.: PCT/CN2023/072934
§ 371 (c)(1),
(2) Date: Oct. 31, 2024

(87) PCT Pub. No.: WO2023/236545
PCT Pub. Date: Dec. 14, 2023

(65) Prior Publication Data

US 2025/0294603 A1 Sep. 18, 2025

(30) Foreign Application Priority Data

Jun. 10, 2022 (CN) ......................... 202210657159.5

(51) Int. Cl.

| | |
|---|---|
| ***H04W 72/541*** | (2023.01) |
| ***H04W 64/00*** | (2009.01) |
| *H04B 7/185* | (2006.01) |

(52) U.S. Cl.
CPC ......... *H04W 72/541* (2023.01); *H04W 64/00* (2013.01); *H04B 7/18502* (2013.01)

(58) Field of Classification Search
CPC .... H04W 72/541; H04W 64/00; H04B 7/185; H04B 7/18502
See application file for complete search history.

(56) References Cited

U.S. PATENT DOCUMENTS

| | | | | |
|---|---|---|---|---|
| 9,848,391 | B2 * | 12/2017 | Jalali | H01Q 1/246 |
| 10,158,420 | B1 * | 12/2018 | Montsma | H04B 7/2041 |
| 10,382,120 | B2 * | 8/2019 | Montsma | H04B 7/18508 |
| 10,574,340 | B2 * | 2/2020 | Montsma | H04B 7/18541 |
| 10,938,472 | B2 * | 3/2021 | Montsma | H04B 7/1858 |
| 11,870,149 | B2 * | 1/2024 | Hayes | H01Q 25/00 |
| 12,074,682 | B2 * | 8/2024 | Gallagher | G01S 13/878 |
| 12,425,082 | B2 * | 9/2025 | Hyslop | H04B 7/04 |

(Continued)

FOREIGN PATENT DOCUMENTS

WO WO-2022142845 A1 * 7/2022 ......... H04B 7/18506

*Primary Examiner* — Hai V Nguyen

(74) *Attorney, Agent, or Firm* — Li & Cai Intellectual Property (USA) Office

(57) ABSTRACT

The present disclosure provides an interference suppression method and apparatus, a storage medium, and an electronic apparatus. The method comprises: calculating the angle range of a formed beam of a first base station to a first terminal, and calculating an interference parameter between the first base station and a second base station; determining, according to the angle range of the formed beam and the interference parameter, whether the first terminal is a target terminal; and if the first terminal is the target terminal, the first base station prohibiting scheduling of the first terminal.

10 Claims, 7 Drawing Sheets

(56) References Cited

U.S. PATENT DOCUMENTS

| | | | | |
|---|---|---|---|---|
| 12,445,988 | B2 * | 10/2025 | Cheng | H04W 72/0446 |
| 2019/0190589 | A1 * | 6/2019 | Montsma | H04W 64/006 |
| 2019/0191334 | A1 * | 6/2019 | Montsma | H04W 28/082 |
| 2019/0363782 | A1 * | 11/2019 | Montsma | H04W 64/006 |
| 2020/0162150 | A1 * | 5/2020 | Montsma | H04B 7/1858 |
| 2022/0124660 | A1 * | 4/2022 | Cheng | H04W 56/0045 |
| 2023/0327725 | A1 * | 10/2023 | Wang | H04B 7/0469 370/329 |
| 2023/0344553 | A1 * | 10/2023 | Sayed Hassan | H04L 1/189 |
| 2025/0240741 | A1 * | 7/2025 | Atungsiri | H04W 56/0015 |

* cited by examiner

INTERFERENCE SUPPRESSION METHOD AND APPARATUS, STORAGE MEDIUM, AND ELECTRONIC DEVICE

CROSS-REFERENCE TO RELATED APPLICATIONS

The present disclosure claims the priority to Chinese Patent Application No. CN202210657159.5 entitled “INTERFERENCE SUPPRESSION METHOD AND APPARATUS, STORAGE MEDIUM, AND ELECTRONIC DEVICE” and filed on Jun. 10, 2022, the contents of which are incorporated herein by reference in their entirety.

TECHNICAL FIELD

The present disclosure relates to the field of communications, and in particular, to an interference suppression method and apparatus, a storage medium, and an electronic device.

BACKGROUND

There are two main solutions for aeronautical communication systems, where one is a satellite communication scheme, and the other is an Air To Ground (ATG) scheme. In an ATG communication system, ground base stations are set up along a flight route or specific airspace, and an ATG terminal is accessed to the Internet through an ATG communication link. The interference of the airline base stations to public network base stations on the ground certainly needs to be considered when the base stations are set up along the flight route. Therefore, it is very important to settle the interference of the airline base stations to the public network base stations on the ground. In the related technology, the ATG system is faced with the technical problem that the interference of ATG base stations to surrounding public network base stations cannot be completely suppressed.

SUMMARY

The present disclosure provides an interference suppression method and apparatus, a storage medium, and an electronic device, so as to at least solve the technical problem in the related technology.

According to an embodiment of the present disclosure, there is provided an interference suppression method, including: calculating an angle range of a shaped beam from a first base station to a first terminal, and calculating an interference parameter of the first base station and a second base station; determining whether the first terminal is a target terminal according to the angle range of the shaped beam and the interference parameter; and if the first terminal is the target terminal, prohibiting the first base station from scheduling the first terminal.

According to another embodiment of the present disclosure, there is provided an interference suppression apparatus, including: a calculation module, which is configured to calculate an angle range of a shaped beam from a first base station to a first terminal, and calculate an interference parameter of the first base station and a second base station; a determination module, which is configured to determine whether the first terminal is a target terminal according to the angle range of the shaped beam and the interference parameter; and a control module, which is configured to prohibit, if the first terminal is the target terminal, the first base station from scheduling the first terminal.

According to still another embodiment of the present disclosure, there is provided a storage medium having a computer program stored therein, wherein the computer program is configured to perform, when executed, operations in the method described in any of method embodiments.

According to yet another embodiment of the present disclosure, there is provided an electronic device, including a memory having a computer program stored therein, and a processor configured to cause the computer program to perform the operations in the method described in any of the method embodiments.

BRIEF DESCRIPTION OF DRAWINGS

The drawings described here are intended to provide a further understanding of the present disclosure and constitutes a part of the present disclosure. The exemplary embodiments of the present disclosure and the description thereof are intended to explain the present disclosure, but do not constitute improper limitation to the present disclosure. In the drawings.

DETAIL DESCRIPTION OF EMBODIMENTS

The present disclosure will be described in detail below with reference to the accompanying drawings in conjunction with embodiments. It should be noted that the embodiments and the features therein may be combined with each other if no conflict is incurred.

It should be noted that the terms “first”, “second” and the like in the description, claims and drawings of the present disclosure are used for distinguishing between similar objects, but not necessarily for describing a particular order or a chronological order.

The satellite communication scheme has a wide coverage range and can cover both the land and the ocean, but has a high deployment and operation cost and a long network delay. Compared with the satellite communication scheme, the ATG scheme has the advantages of low cost, high speed, short delay, and fast technical iteration and upgrading. In the ATG communication system, ground base stations are set up along a flight route or specific airspace, and an ATG terminal is accessed to the Internet through an ATG communication link. The interference of the airline base stations to public network base stations on the ground certainly needs to be considered when the base stations are set up along the flight route. Therefore, it is very important to overcome the interference of the airline base stations to the public network base stations on the ground.

In the ATG system in the related technology, the maximum coverage range of an ATG base station can reach hundreds of kilometers, and the ATG base station points to an ATG terminal in a narrow beam mode. When a downlink slot of the ATG base station overlaps an uplink slot of a public network base station, the ATG base station can cause strong interference to reception of signals of the public network base station in the case of same frequency domain resources. For such interference, a common interference suppression method is implemented by network deployment and planning, that is, the interference is suppressed by maintaining a distance between the base stations. However, due to the ultra-long coverage of the ATG base station, the interference of the ATG base station to the surrounding public network base station cannot be completely suppressed with such method when the ATG terminal flies at a medium or far point in a cell.

No effective solution to the above technical problem has yet been found in the related technology. The present disclosure solves the above technical problem by the following embodiments.

Embodiment One

Figure 1:
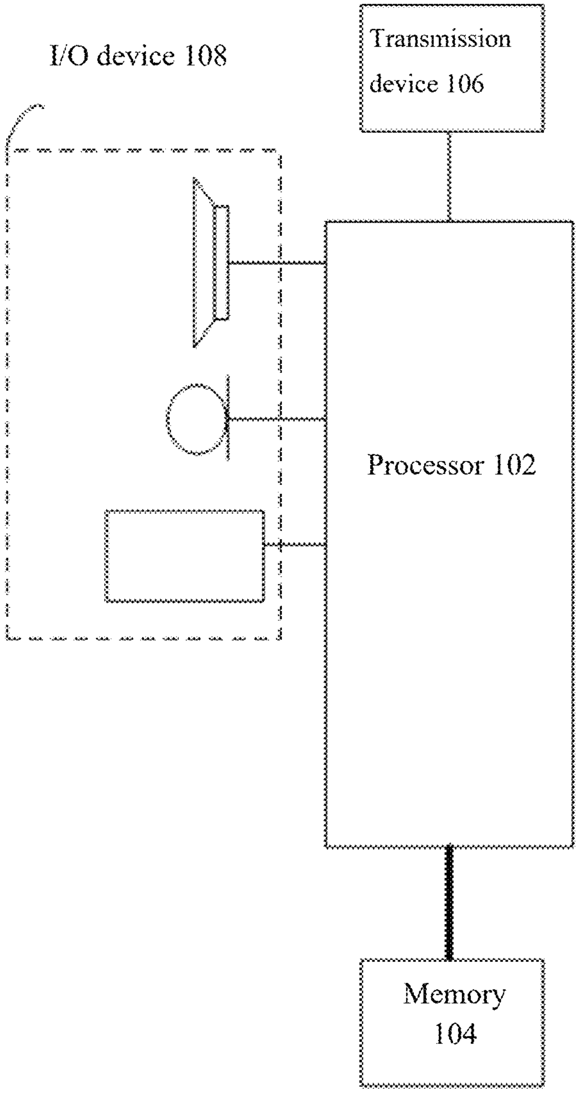
FIG. 1 is a block diagram of a hardware structure of an interference-suppressing base station according to the present disclosure.

The method embodiments provided by the present disclosure can be executed in a base station, a server, a base station controller, or a similar control device. Taking the method embodiments being executed on a base station as an example, FIG. 1 is a block diagram of a hardware structure of an interference-suppressing base station according to the present disclosure. As shown in FIG. 1, the base station may include one or more processors 102 (merely one processor is shown in FIG. 1, and the processor 102 may include, but is not limited to, a processing device such as a microprocessor (e.g., a microcontroller unit (MCU)) or a programmable logic device (e.g., a field programmable gate array (FPGA))), and a memory 104 configured to store data. In an exemplary embodiment, the base station may further include a transmission device 106 for communication functions and an input/output device 108. It should be understood by those of ordinary skill in the art that the structure shown in FIG. 1 is merely for illustration and is not intended to limit the structure of the above base station. For example, the base station may include more or fewer components than those shown in FIG. 1, or may have a configuration different from that shown in FIG. 1.

The memory 104 may be configured to store computer programs, such as software programs and modules of application software. For example, the memory 104 may be configured to store computer programs corresponding to the interference suppression method provided by the present disclosure. By executing the computer programs stored in the memory 104, the processor 102 performs various functional applications and data processing, that is, implementing the aforesaid method. The memory 104 may include a high-speed random access memory, and may also include a non-volatile memory, such as one or more magnetic storage devices, flash memories, or other non-volatile solid-state memories. In some examples, the memory 104 may further include a memory remotely arranged relative to the processor 102, and the remote memory may be connected to the base station via a network. The examples of the network include, but are not limited to, the Internet, an intranet, a local area network, a mobile communication network, and the combinations thereof.

The transmission device 106 is configured to receive or transmit data via a network. The specific examples of the network may include a wireless network provided by a communication provider of the base station. In an example, the transmission device 106 includes a Network Interface Controller (NIC) that may be connected to other network devices via the base station so as to communicate with the Internet. In another example, the transmission device 106 may be a Radio Frequency (RF) module that is configured to communicate with the Internet in a wireless manner.

Figure 2:
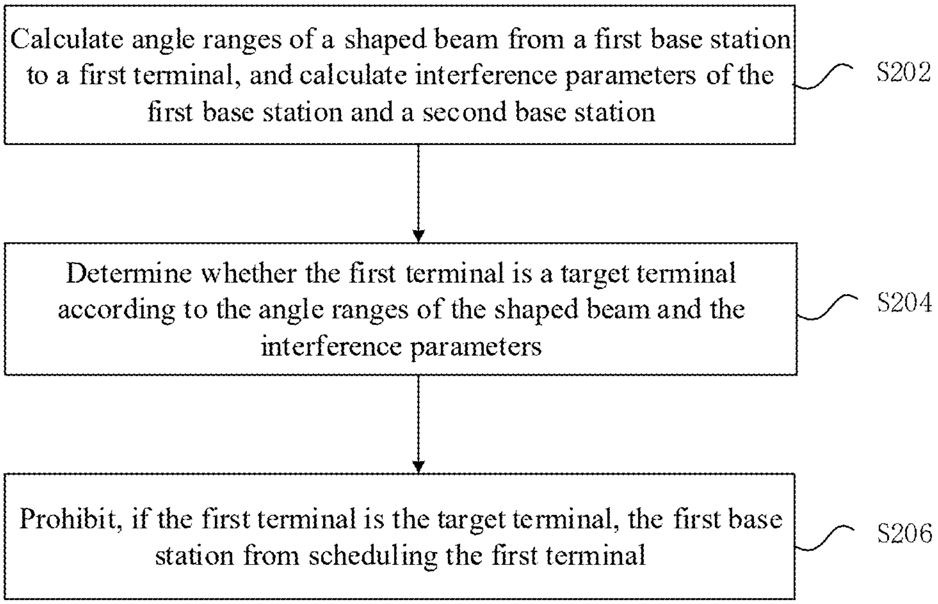
FIG. 2 is a flowchart illustrating an interference suppression method according to the present disclosure.

An interference suppression method is provided in the present embodiment. FIG. 2 is a flowchart illustrating an interference suppression method according to the present disclosure. As shown in FIG. 2, the interference suppression method includes the following operations S202, S204 and S206.

At operation S202, calculating an angle range of a shaped beam from a first base station to a first terminal, and calculating an interference parameter of the first base station and a second base station.

In an exemplary embodiment, the first base station is an ATG base station and is configured to perform ground-to-air communication with the first terminal in the air, and the second base station is a public network base station, i.e., a ground base station, and is configured to communicate with a second terminal on the ground.

Figure 3:
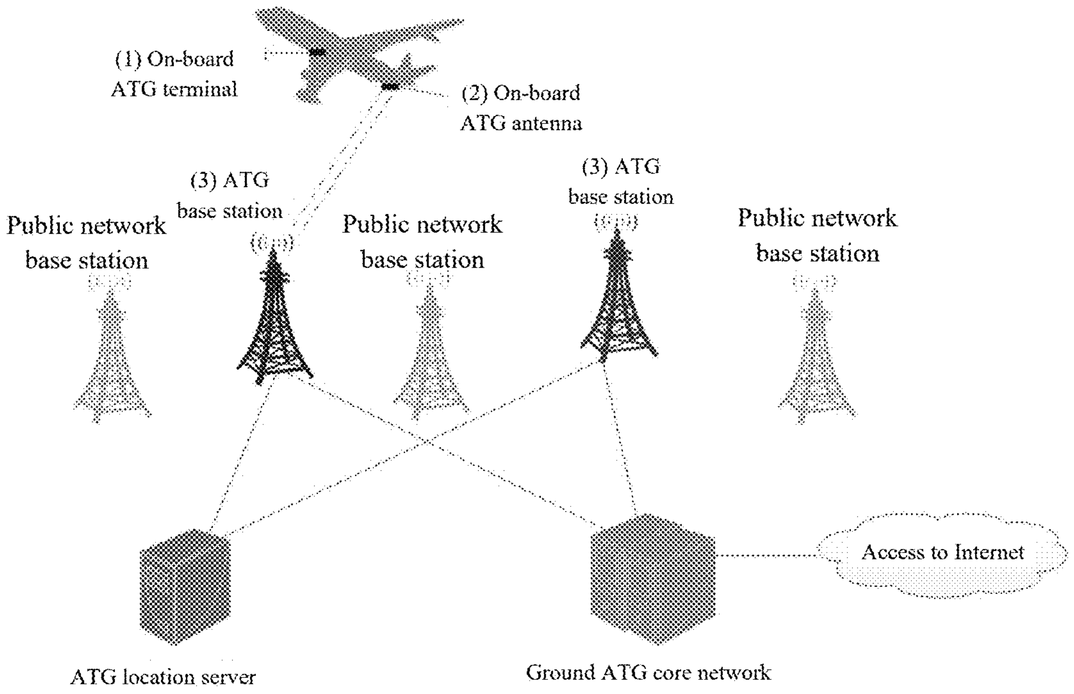
FIG. 3 is a schematic structural diagram of a network system applied in the present disclosure.

FIG. 3 is a schematic structural diagram of a network system applied in the present disclosure, and the network system includes an ATG system and a ground communication system. The ATG system includes the ATG base station and the ATG terminal, and the ground communication system includes the public network base station and a public network terminal (not shown). The whole network system includes: the ATG base station, the public network base station, the ATG terminal, etc. The ATG base station is connected to an ATG location server and a ground ATG core network, and the ATG terminal is carried on an aircraft which has an on-board ATG antenna installed thereon.

In an exemplary embodiment, the interference parameter in the present embodiment are configured to represent wireless resource occupation situations (such as an overlapping state of slot resources and an overlapping state of frequency resources) of the first base station and the second base station and a relative position relationship between the first base station and the second base station. For example, the interference parameters include an interference slot bitmap of the first base station and the second base station, and the connection angle between the first base station and the second base station.

At operation S204, determining whether the first terminal is a target terminal according to the angle range of the shaped beam and the interference parameter.

The target terminal in the present embodiment refers to an ATG terminal which, when scheduled by an ATG base station, causes interference to a ground communication system by the ATG base station, or a ground terminal which, when scheduled by a first-type base station of a ground communication system, causes interference to a second-type base station of the ground communication system by the first-type base station. In the case where the first terminal is the ATG terminal, the target terminal refers to such a terminal that when the terminal is scheduled by the ATG base station, the ATG base station causes the interference to the ground communication system (e.g., a public network base station). In some other cases where the first terminal is the ground communication terminal, the target terminal refers to such a terminal that when the terminal is scheduled by the first-type public network base station, the first-type public network base station causes the interference to the second-type public network base station; and in those cases, both the first base station and the second base station are base stations adopting Direction of Arrival (DOA) beamforming in the ground communication system. Description of the following embodiments is given by taking the first terminal being the ATG terminal as an example.

At operation S206, if the first terminal is the target terminal, prohibiting the first base station from scheduling the first terminal.

On the other hand, if the first terminal is not the target terminal, the first base station is controlled to schedule the first terminal. In an exemplary embodiment, before calculating the angle range of the shaped beam from the first base station to the first terminal, the method further includes: determining a first terminal list currently scheduled by the first base station, and selecting the first terminal from the first terminal list.

Through the above operations of calculating the angle range of the shaped beam from the first base station to the first terminal and calculating the interference parameter of the first base station and the second base station, whether the first terminal is the target terminal is determined according to the angle ranges of the shaped beam and the interference parameters; and if the first terminal is the target terminal, the first base station is prohibited from scheduling the first terminal, which can avoid the interference caused by the first base station to the second base station when the first base station schedules the first terminal, solve the technical problem in the related technology that the interference cannot be completely suppressed through network deployment and planning, reduce the interference of the first base station to the second base station to the greatest extent, effectively reduce a loss rate of air interface resources of cells covered by the first base station, and reduce a downlink flow loss from the first base station to the first terminal.

In an exemplary embodiment, a main body for performing the above operations may be a base station, such as the ATG base station, the ground base station, a base station controller, or a server, but the present disclosure is not limited thereto.

In the present embodiment, calculating the angle ranges of the shaped beam from the first base station to the first terminal includes operations S11 to S13.

At operation S11, acquiring terminal position information of the first terminal.

When the first terminal establishes or requests to establish communication with the first base station, the first terminal may report a position thereof in real time or the first base station may acquire the position of the first terminal. For example, when the ATG base station performs downlink scheduling, the terminal reports Global Navigation Satellite System (GNSS) information in real time.

At operation S12, calculating an angle of the shaped beam from the first base station to the first terminal according to the terminal position information.

In the present embodiment, the ATG system includes the ATG base station and the ATG terminal, the ATG base station (corresponding to the first base station) is a special station set up on the ground, can adopt a narrow beam for beamforming, and has the characteristic of wide coverage, and the ATG terminal is a terminal device carried on an aircraft such as an airplane. The ATG terminal (corresponding to the first terminal) reports the GNSS position information in real time, the ATG base station calculates DOA angles according to the GNSS information of the terminal, and the base station adopts DOA beamforming in a downlink direction. The angles of the shaped beam include a Horizontal angle of DOA (HDOA) and a Vertical angle of DOA (VDOA).

At operation S13, calculating the angle range of the shaped beam from the first base station to the first terminal according to the angles of the shaped beam.

In an implementation of the present embodiment, the angle of the shaped beam include the HDOA and the VDOA, and the calculating of the angle range of the shaped beam from the first base station to the first terminal according to the angle of the shaped beam includes: acquiring a horizontal angle width beamWidthH and a vertical angle width beamWidthV of the shaped beam from the first base station; calculating the angle range of the shaped beam from the first base station to the first terminal by the following expressions: an angle range of the shaped beam in a horizontal dimension=[HDOA−beamWidthH/2,HDOA+beamWidthH/2], and an angle range of the shaped beam in a vertical dimension=[VDOA−beamWidthV/2,VDOA+beamWidthV/2]; and the angle range of the shaped beam include a horizontal angle range and a vertical angle range of the shaped beam.

After calculating, according to the GNSS information reported by the terminal in real time, the DOA angle (the HDOA and the VDOA) of the shaped beam from the ATG base station to the first terminal at operation S12, and the angle range of the shaped beam when the ATG base station performs beamforming on the terminal are calculated according to the horizontal angle width (beamWidthH) and the vertical angle width (beamWidthV) of the shaped beam from the ATG base station: the angle range of the shaped beam in the horizontal dimension is [HDOA−beamWidthH/2,HDOA+beamWidthH/2], and the angle range of the shaped beam in the vertical dimension is [VDOA−beamWidthV/2,VDOA+beamWidthV/2].

In the present embodiment, the interference parameter includes an interference slot bitmap of the first base station and the second base station and a connection angle between the first base station and the second base station, and the calculating of the interference parameter of the first base station and the second base station includes operations S21 and S22.

At operation S21, generating the interference slot bitmap of the first base station and the second base station, and calculating the connection angle between the first base station and the second base station.

In an example, the generating of the interference slot bitmap of the first base station and the second base station includes: acquiring a first frame structure of the first base station, and inquiring a second frame structure of the second base station, with the first frame structure including a plurality of slots, the second frame structure including a plurality of slots, and a slot length of the first frame structure being the same as that of the second frame structure; analyzing the first frame structure and the second frame structure, and determining whether a downlink slot in the first frame structure overlaps an uplink slot in the second frame structure; for each slot position, configuring, if a downlink slot in the first frame structure overlaps an uplink slot in the second frame structure, a first flag bit at a corresponding slot position in an initial slot bitmap, and configuring, if the downlink slot in the first frame structure does not overlap the uplink slot in the second frame structure, a second flag bit at the corresponding slot position in the initial slot bitmap, so as to obtain the interference slot bitmap of the first base station and the second base station.

In a communication network using time resources for communication, a slot is a time slice in a time division multiplexing mode and is a communication unit, and each slot may be further divided into a plurality of time codes according to a cycle, for example, a slot of a 2.5 ms double-cycle base station is divided into 10 time codes (0-9). Since the slot length of the first frame structure is the same as that of the second frame structure, slots of the first base station may be aligned with those of the second base station, so that, for each slot position (each time code of the slot), it may be determined whether the slot is used for uplink communication or downlink communication. The slots of the two base stations are merely allowed for uplink communication or downlink communication at a same slot position, otherwise interference may be incurred. For example, for a time code 1 of slot 1, if the first base station performs downlink communication with the time code 1, that is, using slot 1 as a downlink slot, and meanwhile, the second base station performs uplink communication with the time code 1, that is, using slot 1 as an uplink slot, then interference caused by slot occupation may be incurred.

Figure 4:
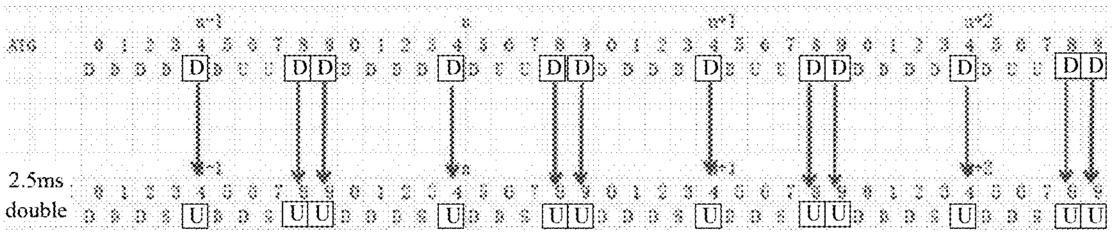
FIG. 4 is a schematic diagram illustrating determination of interference slots according to the present disclosure.

FIG. 4 is a schematic diagram illustrating determination of interference slots according to the present disclosure. The first base station is the ATG base station, the second base station is the 2.5 ms double-cycle base station, four slots, i.e., n−1 to n+2, are shown, each slot includes 10 time codes from 0 to 9, D represents a downlink slot position, and U represents an uplink slot position. When a downlink slot position of the ATG base station overlaps an uplink slot position of the public network base station, a flag bit of a corresponding slot position in the interference slot bitmap is set to be 1, otherwise the flag bit of the corresponding slot position in the interference slot bitmap is set to be 0.

In the case where a frame structure of the ATG base station and frame structures of a plurality of surrounding public network base stations are known, an ATG interference slot bitmap is firstly determined. A method for determining the interference slot bitmap is illustrated by taking a New Radio Time Division Duplexing (NR TDD) 2.5 ms double-cycle base station as an example, the ATG base station inquires the frame structures of N surrounding public network base stations through an Xn interface, and calculates the interference slot bitmap; when a downlink slot of the ATG base station overlaps an uplink slot of a public network base station, the slot in the interference slot bitmap is set to be 1, otherwise the slot in the interference slot bitmap is set to be 0, thus obtaining a plurality of interference slot bitmaps, i.e., $Bitmap_1$, $Bitmap_2$, $Bitmap_3$ . . . $Bbitmap_N$, with each interference slot bitmap corresponding to one public network base station that may be possibly subjected to interference.

In another example, the calculating of the connection angle between the first base station and the second base station includes: acquiring first position information of the first base station, and inquiring second position information of the second base station; and the calculating of the connection angle between the first base station and the second base station according to the first position information and the second position information, wherein the connection angle includes a horizontal angle and a vertical angle.

In an exemplary embodiment, the ATG base station inquires GNSS information of a surrounding public network base station through an Xn interface, and calculates a connection angle, which includes a horizontal angle H and a vertical angle V, between the ATG base station and the public network base station according to GNSS information of the ATG base station and the GNSS information of the public network base station. In the case where there are N public network base stations around the ATG base station, a plurality of sets of angles ($H_1$, $V_1$), ($H_2$, $V_2$) . . . ($H_N$, $V_N$) may be calculated.

Figure 5:
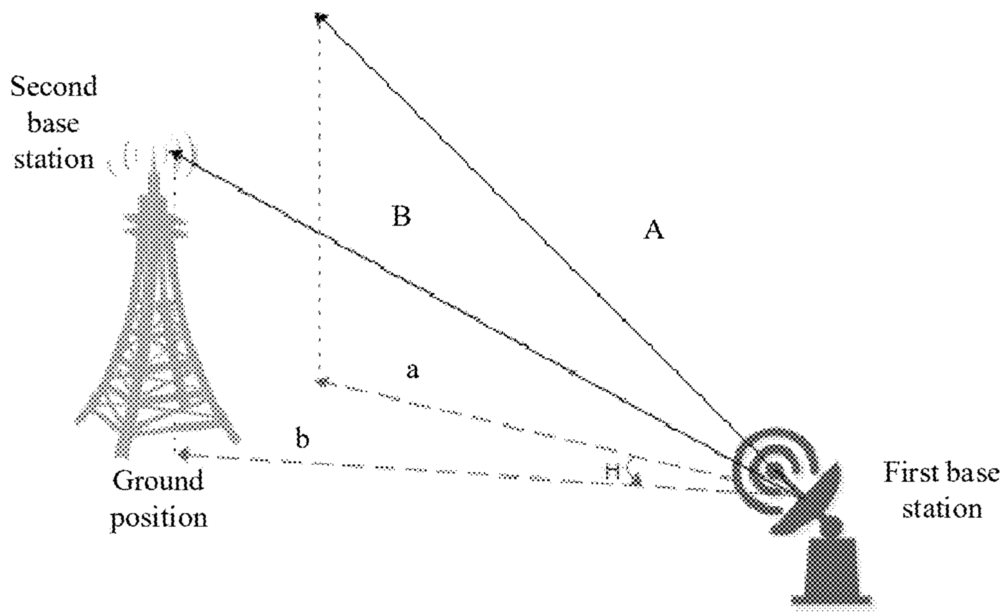
FIG. 5 is a schematic diagram illustrating calculation of a horizontal angle between a first base station and a second base station according to the present disclosure.
Figure 6:
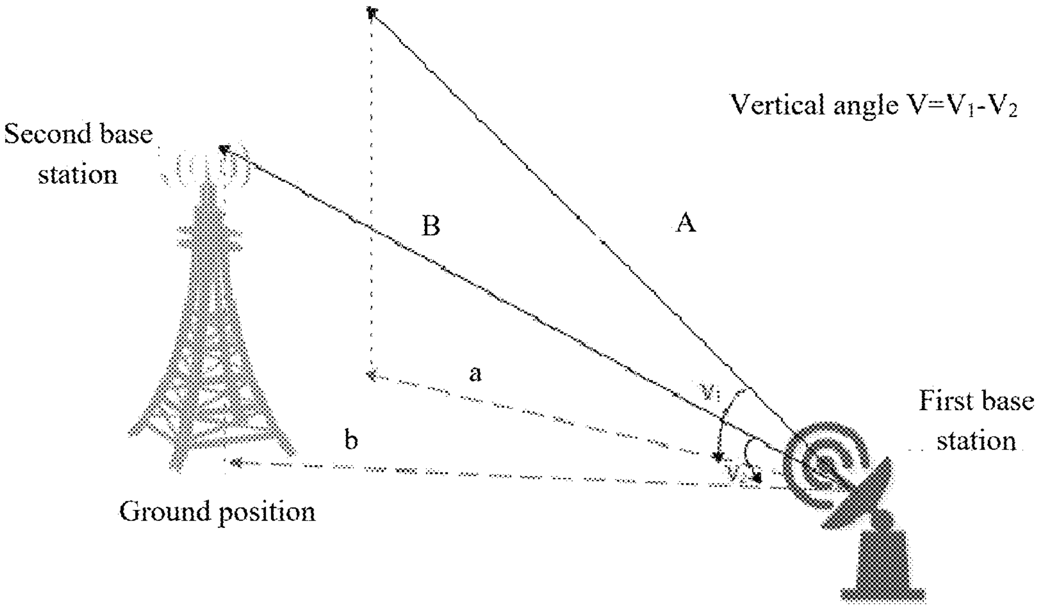
FIG. 6 is a schematic diagram illustrating calculation of a vertical angle between a first base station and a second base station according to the present disclosure.

FIG. 5 is a schematic diagram illustrating calculation of a horizontal angle between a first base station and a second base station according to the present disclosure, and FIG. 6 is a schematic diagram illustrating calculation of a vertical angle between a first base station and a second base station according to the present disclosure. In FIG. 5 and FIG. 6, A, serving as a normal line of an antenna array of the first base station, is perpendicular to the antenna array, and intersects with the antenna array (for example, the normal line interests with a center point of the antenna array), B is a connection line from the antenna array of the first base station to an antenna array of the second base station, a is a projection of A on a horizontal ground, b is a projection of B on the horizontal ground, a horizontal angle H is a minimum included angle between a and b, $V_1$ is an included angle between A and a horizontal plane, $V_2$ is an included angle between B and the horizontal plane, and a vertical angle V is a difference between $V_1$ and $V_2$.

At operation S22, determining the interference slot bitmap and the connection angle as the interference parameter of the first base station and the second base station.

In an implementation of the present embodiment, the interference parameter includes the interference slot bitmap of the first base station and the second base station and the connection angle between the first base station and the second base station, and determining whether the first terminal is the target terminal according to the angle ranges of the shaped beam and the interference parameters includes: determining whether the connection angle is within the angle range of the shaped beam, and determining whether a downlink slot of the first base station corresponding to the first terminal in the interference slot bitmap is configured with the first flag bit, with the first flag bit being configured to represent that the downlink slot of the first base station overlaps the uplink slot of the second base station; and if the connection angle is within the angle ranges of the shaped beam and the downlink slot of the first base station corresponding to the first terminal in the interference slot bitmap is configured with the first flag bit, determining that the first terminal is the target terminal.

In some examples, if no interference slot bitmap is generated in advance, the determination may be directly carried out, that is, directly determining whether the downlink slot used by the first base station when scheduling the first terminal overlaps the uplink slot of the second base station, and determining that the first terminal is the target terminal if the downlink slot used by the first base station when scheduling the first terminal overlaps the uplink slot of the second base station.

In another implementation of the present embodiment, determining whether the first terminal is the target terminal includes: determining whether a position of the second base station is within a beamforming range of the first base station for scheduling the first terminal, and determining whether a receiving antenna of the second base station is in a direct-facing relationship with a transmitted beam from the first base station; and if the position of the second base station is within the beamforming range of the first base station for scheduling the first terminal and the receiving antenna of the second base station is in the direct-facing relationship with the transmitted beam from the first base station, determining that the first terminal is the target terminal.

When a position of a public network base station is in a beamforming direction of the ATG base station and a receiving antenna of the public network base station is in a direct-facing relationship with a transmitted beam from the ATG base station, the public network base station may be subjected to strong interference of the ATG base station.

The determining of whether the connection angle is within the angle range of the shaped beam includes: determining whether the horizontal angle of the connection angle is within the horizontal angle range of the shape beam in term of the angle range of the shaped beam, and determining whether the vertical angle of the connection angle is within the vertical angle range of the shape beam in term of the angle range of the shaped beam; and determining that the connection angle is within the angle range of the shaped beam merely if the horizontal angle of the connection angle is within the horizontal angle range of the shape beam in term of the angle range of the shaped beam and the vertical angle of the connection angle is also within the vertical angle range of the shape beam in term of the angle range of the shaped beam.

In an example, the second base station includes a plurality of public network base stations gNB. For a certain public network base station $gNB_i$, according to the calculated angle $(H_i, V_i)$ and the interference slot bitmap $bitmap_i$, if $(H_i, V_i)$ of the public network base station fall within the angle range of the shaped beam, that is, if $HOA-beamWidthH/2 \leq H_i \leq HDOA+beamWidthH/2$ and $VDOA-beamWidthV/2 \leq V_i \leq VDOA+beamWidthV/2$ are both satisfied, and a corresponding downlink slot in the interference slot bitmap $bitmap_i$ of the public network base station is set to 1, that is, the downlink slot is overlapped, then the terminal is not scheduled in the downlink slot; otherwise, the terminal is normally scheduled in the downlink slot.

Figure 7:
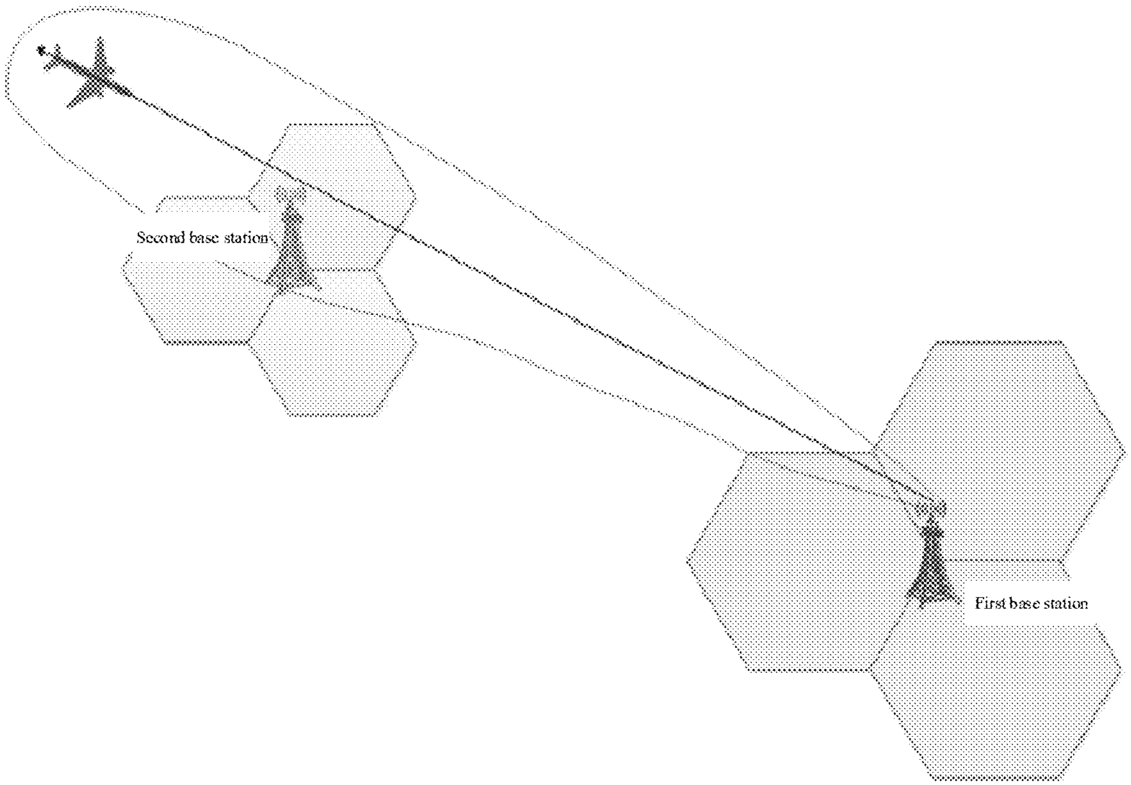
FIG. 7 is a schematic diagram illustrating a public network base station within a beamforming range of an ATG base station according to the present disclosure.
Figure 8:
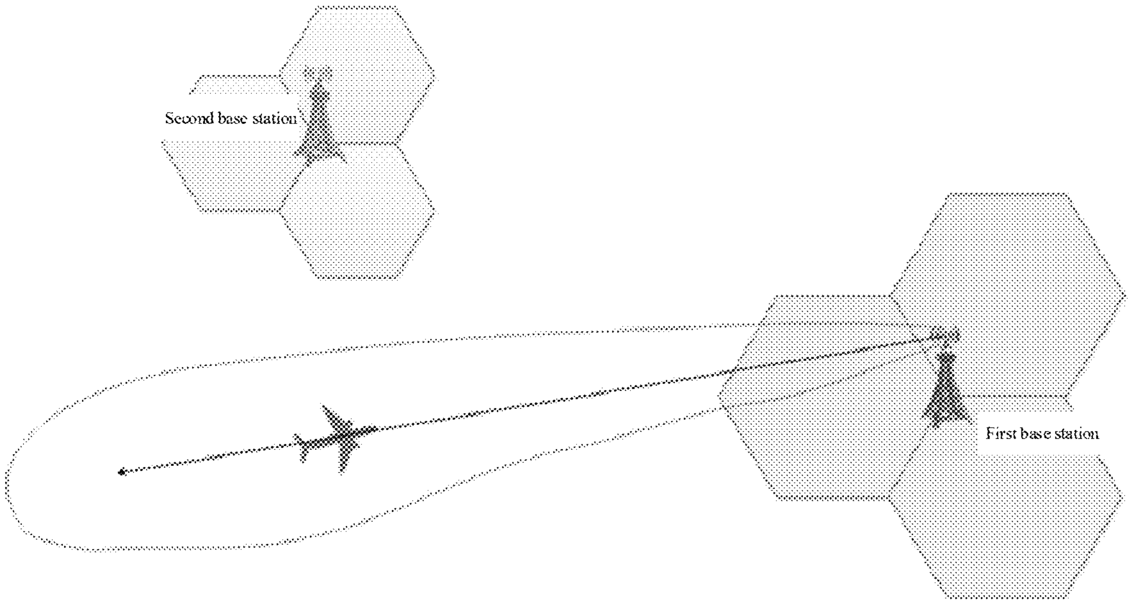
FIG. 8 is a schematic diagram illustrating a public network base station beyond a beamforming range of an ATG base station according to the present disclosure.

FIG. 7 is a schematic diagram illustrating a public network base station being within a beamforming range of an ATG base station according to the present disclosure, and as shown in FIG. 7, the second base station is within the beamforming range of the first base station. FIG. 8 is a schematic diagram illustrating a public network base station being beyond a beamforming range of an ATG base station according to the present disclosure, and as shown in FIG. 8, the second base station is beyond the beamforming range of the first base station.

Figure 9:
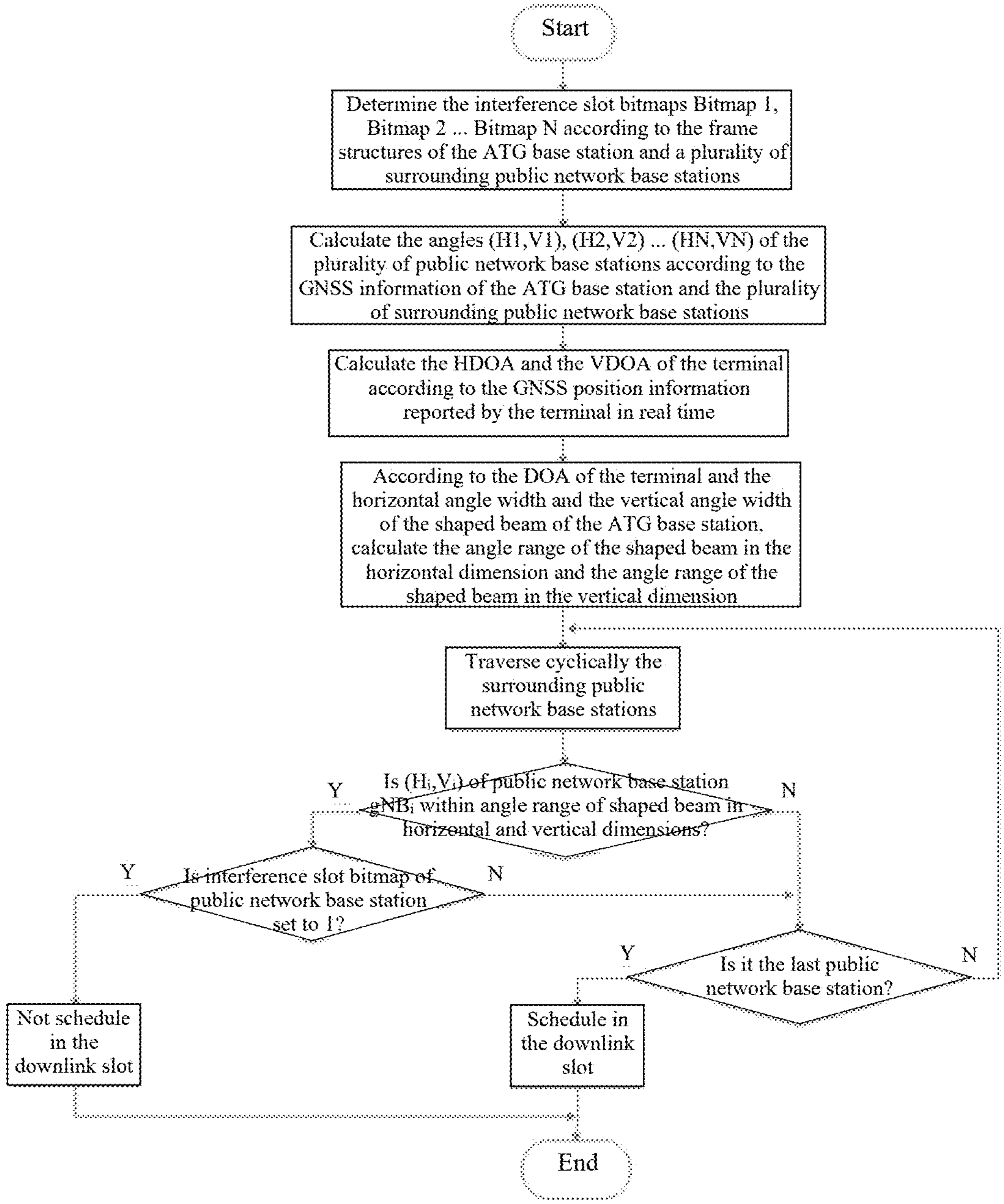
FIG. 9 is a flowchart illustrating a complete interference suppression process according to the present disclosure.

FIG. 9 is a flowchart illustrating a complete interference suppression process according to the present disclosure, and is used to illustrate the solution of the present embodiment in detail by an implementation. In this implementation, the first base station is the ATG base station, the first terminal is the ATG terminal, the second base station is the public network base station, the number of public network base stations is N, and the ATG base station adopts a TDD system, and adopts DOA beamforming in a downlink direction. The ATG base station may simultaneously schedule a plurality of ATG terminals. For a certain ATG terminal, a detailed implementation process of the interference suppression method includes operations 101 to 108.

Operation 101: determining the interference slot bitmaps $Bitmap_1$, $Bitmap_2$ . . . $Bbitmap_N$ according to the frame structures of the ATG base station and the N public network base stations. Operation 102: calculating the angles $(H_1, V_1)$, $(H_2, V_2)$ . . . $(H_N, V_N)$ of the surrounding N public network base stations according to the GNSS information of the ATG base station and the N public network base stations. Operation 103: calculating, by the ATG base station, the HDOA and the VDOA of the terminal according to the GNSS position information reported by the terminal in real time. Operation 104: according to the horizontal angle width (beamWidthH) and the vertical angle width (beamWidthV) of the shaped beam of the ATG base station, calculating the angle ranges of the shaped beam from the ATG base station when the ATG base station performs beamforming on the terminal: the angle range of the shaped beam in the horizontal dimension is [HDOA−beamWidthH/2,HDOA+beamWidthH/2], and the angle range of the shaped beam in the vertical dimension is [VDOA−beamWidthV/2,VDOA+beamWidthV/2] Operation 105: cyclically traversing stored information of the N public network base stations. Operation 106: for a certain public network base station $gNB_i$, when $(H_i, V_i)$ of the public network base station falls within the angle range of the shaped beam in the horizontal dimension and the angle range of the shaped beam in the vertical dimension, that is, when $HDOA-beamWidthH/2 \leq H_i \leq HDOA+beamWidthH/2$ and $VDOA-beamWidthV/2 \leq V_i \leq VDOA+beamWidthV/2$ are both satisfied, performing operation 107; otherwise performing operation 108.

Operation 107: if it is determined that a corresponding downlink slot in the interference slot bitmap $Bitmap_i$ of the public network base station is set to 1, determining that the ATG base station does not schedule the terminal, and ending the process; otherwise performing operation 108.

Operation 108: determining whether a traversed public network base station is the last public network base station, and if the traversed public network base station is the last public network base station, determining that scheduling is normally performed in a downlink slot, and ending the process; otherwise returning to operation 105 to start processing a next public network base station.

When the ATG base station adopts DOA beamforming in the downlink direction, the interference slot bitmap concerning the downlink slots of the ATG base station and the uplink slots of the public network base station is firstly determined according to the frame structures of the public network base station and the ATG base station, and then the connection angle, which includes the horizontal angle H and the vertical angle V, between the ATG base station and the public network base station are calculated according to the GNSS position information of the ATG base station and the public network base station; and the ATG base station calculates the HDOA and the VDOA of the ATG terminal according to the GNSS position information reported by the ATG terminal in real time during flight, and then calculates, according to the horizontal angle width (beamWidthH) and the vertical angle width (beamWidthV) of the shaped beam of the ATG base station, the angle range ($[H_1,H_2]$) in the horizontal dimension and the angle range ($[V_1,V_2]$) in the vertical dimension when the ATG base station performs beamforming on the terminal. When the horizontal angle H and the vertical angle V of the public network base station both fall within the angle range ($[H_1,H_2]$) in the horizontal dimension and the angle range ($[V_1,V_2]$) in the vertical dimension and the downlink slot of the ATG base station overlaps the uplink slot of the public network base station, the terminal is not scheduled in the downlink slot; otherwise the terminal is normally scheduled in the downlink slot.

The present embodiment provides an interference suppression method for suppressing the interference of the ATG base station to the public network base station based on DOA beamforming angle ranges. When the position of the public network base station is in the beamforming direction of the ATG base station and the receiving antenna of the public network base station is in the direct-facing relationship with the transmitted beam from the ATG base station, the public network base station may be subjected to strong interference of the ATG base station; and since the shaped beam of the ATG base station is a narrow beam, the interference to cells covered by public network base stations in other position relationships is much weaker. With the interference suppression method, downlink slot scheduling of the ATG base station which may cause the strong interference to the public network base station can be limited according to the geographical position relationship between the ATG base station and the public network base station and the ranges of the shaped beam from the ATG base station, and the interference to the public network base station can be reduced under the condition that utilization of air interface resources of cells covered by the ATG base station is affected to the least extent.

By adopting the interference suppression method provided in the present embodiment, a downlink scheduling policy of the ATG base station for the public network base stations which the ATG base station directly faces is adjusted according to the position relationships between the ATG base station and the public network base stations, so that the interference to the public network base stations caused when the ATG base station schedules the ATG terminal can be reduced to the greatest extent, a loss rate of the air interface resources of the cells covered by the ATG base station can be effectively reduced, and a downlink flow loss of the ATG system can be reduced to the greatest extent.

Through the above description of the implementations, those of ordinary skill in the art can understand clearly that the method according to the above embodiments may be implemented by software together with a necessary general-purpose hardware platform, and may also be implemented by hardware, but the former is better in many cases. Based on such understanding, the essence of the technical solutions of the present disclosure or the part of the technical solutions of the present disclosure contributing to the existing technology may be implemented in a form of a software product, which is stored in a storage medium (such as a Read-Only Memory (ROM)/Random Access Memory (RAM), a magnetic disk or an optical disc) and includes several instructions to enable a terminal device (which may be a mobile phone, a computer, a server or a network device) to perform the method described in each of the embodiments of the present disclosure.

Embodiment Two

An interference suppression apparatus is provided in the present embodiment, and is configured to implement the above embodiment and preferable implementations, and what is illustrated above will not be repeated here. The term "module" used below refers to software, hardware, or a combination of software and hardware that can perform predetermined functions. Although the apparatus described in the following embodiment is preferably implemented by software, the implementations of the apparatus by hardware or a combination of software and hardware are possible and can be conceived.

Figure 10:
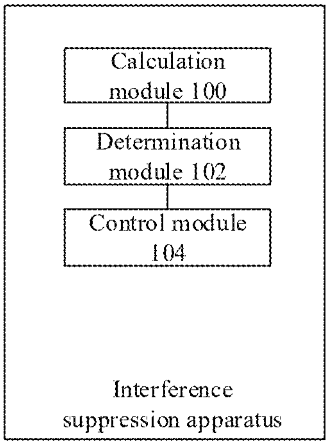
FIG. 10 is a block diagram of an interference suppression apparatus according to the present disclosure.

FIG. 10 is a block diagram of an interference suppression apparatus according to the present disclosure. As shown in FIG. 10, the apparatus includes a calculation module 100, a determination module 102, and a control module 104.

The calculation module 100 is configured to calculate an angle range of a shaped beam from a first base station to a first terminal, and calculate an interference parameter of the first base station and a second base station. The determination module 102 is configured to determine whether the first terminal is a target terminal according to the angle range of the shaped beam and the interference parameter. The control module 104 is configured to prohibit, if the first terminal is the target terminal, the first base station from scheduling the first terminal.

In an exemplary embodiment, the calculation module includes: an acquisition unit configured to acquire terminal position information of the first terminal; a first calculation unit configured to calculate angles of the shaped beam from the first base station to the first terminal according to the terminal position information; and a second calculation unit configured to calculate the angle range of the shaped beam from the first base station to the first terminal according to the angle of the shaped beam.

In an exemplary embodiment, the angles of the shaped beam include a Horizontal angle of DOA (HDOA) and a Vertical angle of DOA (VDOA), and the second calculation unit includes: an acquisition subunit configured to acquire a horizontal angle width beamWidthH and a vertical angle width beamWidthV of the shaped beam from the first base station; and a calculation subunit configured to calculate the angle ranges of the shaped beam from the first base station to the first terminal by the following expressions: an angle range of the shaped beam in a horizontal dimension=[HDOA−beamWidthH/2,HDOA+beamWidthH/2], and an angle range of the shaped beam in a vertical dimension=[VDOA−beamWidthV/2,VDOA+beamWidthV/2]. The angle range of the shaped beam includes a horizontal angle range and a vertical angle range of the shaped beam.

In an exemplary embodiment, the calculation module includes: a processing unit configured to generate an interference slot bitmap of the first base station and the second base station, and calculating a connection angle between the first base station and the second base station; and a determination unit configured to determine the interference slot bitmap and the connection angle as the interference parameter of the first base station and the second base station.

In an exemplary embodiment, the processing unit includes: an acquisition subunit configured to acquire first position information of the first base station, and inquire second position information of the second base station; and a calculation subunit configured to calculate the connection angle between the first base station and the second base station according to the first position information and the second position information, with the connection angle including a horizontal angle and a vertical angle.

In an exemplary embodiment, the processing unit includes: a processing subunit configured to acquire a first frame structure of the first base station, and inquire a second frame structure of the second base station, with the first frame structure including a plurality of slots, the second frame structure including a plurality of slots, and a slot length of the first frame structure being the same as that of the second frame structure; a determination subunit configured to analyze the first frame structure and the second frame structure, and determine whether a downlink slot in the first frame structure overlaps an uplink slot in the second frame structure; and a configuration subunit, which is configured to, for each slot position, configure, if a downlink slot in the first frame structure overlaps an uplink slot in the second frame structure, a first flag bit at a corresponding slot position in an initial slot bitmap, and configure, if the downlink slot in the first frame structure does not overlap the uplink slot in the second frame structure, a second flag bit at the corresponding slot position in the initial slot bitmap, so as to obtain the interference slot bitmap of the first base station and the second base station.

In an exemplary embodiment, the interference parameter includes the interference slot bitmap of the first base station and the second base station and the connection angle between the first base station and the second base station, and the determination module includes: a judging unit configured to determine whether the connection angle is within the angle range of the shaped beam, and determine whether a downlink slot of the first base station corresponding to the first terminal in the interference slot bitmap is configured with the first flag bit, with the first flag bit being configured to represent that the downlink slot of the first base station overlaps the uplink slot of the second base station; and a determination unit configured to determine, if the connection angle is within the angle ranges of the shaped beam and the downlink slot of the first base station corresponding to the first terminal in the interference slot bitmap is configured with the first flag bit, that the first terminal is the target terminal.

It should be noted that each of the above modules may be implemented by software or hardware, and when implemented by hardware, the modules may be implemented in a following way: all the modules are located in a same processor; or the modules are randomly combined and located in different processors. However, the implementation of the above modules is not limited thereto.

Embodiment Three

A storage medium is provided in the present embodiment of the present disclosure, and has a computer program stored therein. The computer program is configured to perform, when executed, the operations described in any of the above method embodiments.

In an exemplary embodiment, in the present embodiment, the storage medium may be configured to store the computer program for performing the following operations S1 to S3, in which:

At operation S1, calculating an angle range of a shaped beam from a first base station to a first terminal, and calculating an interference parameter of the first base station and a second base station. At operation S2, determining whether the first terminal is a target terminal according to the angle range of the shaped beam and the interference parameter. At operation S3, if the first terminal is the target terminal, prohibiting the first base station from scheduling the first terminal.

In an exemplary embodiment, in the present embodiment, the storage medium may include, but is not limited to, various media capable of storing the computer program, such as a Universal Serial Bus Flash Disk (a USB flash disk), an ROM, an RAM, a mobile hard disk, a magnetic disk and an optical disc.

An embodiment of the present disclosure further provides an electronic device, including a memory having a computer program stored therein, and a processor configured to run the computer program to perform the operations described in any of the above method embodiments.

In an exemplary embodiment, the electronic device may further include a transmission device and an input/output device, and both the transmission device and the input/output device are connected to the processor.

In an exemplary embodiment, in the present embodiment, the processor may be configured to perform the following operations S1 to S3 with the computer program.

At operation S1, calculating an angle range of a shaped beam from a first base station to a first terminal, and calculating an interference parameter of the first base station and a second base station. At operation S2, determining whether the first terminal is a target terminal according to the angle range of the shaped beam and the interference parameters. At operation S3, if the first terminal is the target terminal, prohibiting the first base station from scheduling the first terminal.

In an exemplary embodiment, reference may be made to the examples described in the above embodiments and optional implementations for specific examples of the present embodiment, and thus the specific examples of the present embodiment are not described in detail here.

According to the present disclosure, the angle range of the shaped beam from the first base station to the first terminal and the interference parameter of the first base station and the second base station are calculated, whether the first terminal is the target terminal is determined according to the angle range of the shaped beam and the interference parameter; and if the first terminal is the target terminal, the first base station is prohibited from scheduling the first terminal, which can avoid the interference caused by the first base station to the second base station when the first base station schedules the first terminal, solve the technical problem in the related technology that the interference cannot be completely suppressed through network deployment and planning, reduce the interference of the first base station to the second base station to the greatest extent, effectively reduce the loss rate of the air interface resources of the cells covered by the first base station, and reduce the downlink flow loss from the first base station to the first terminal.

Apparently, it should be understood by those of ordinary skill in the art that all the modules or operations of the present disclosure described above may be implemented by a general-purpose computing device, may be integrated in a single computing device or distributed on a network composed of a plurality of computing devices. In some exemplary embodiments, the modules or operations may be implemented by program codes executable by a computing device, such that the modules or operations can be stored in a storage device and executed by a computing device. In some cases, the operations illustrated or described may be performed in an order different from that described herein. The modules or operations may be separately made into integrated circuit modules, or some of the modules or operations may be made into a single integrated circuit module. Thus, the present disclosure is not limited to any specific combination of hardware and software.

The description above is merely of the preferable embodiments of the present disclosure, but is not intended to limit the present disclosure. Various modifications and changes may be made to the present disclosure by those of ordinary skill in the art. Any modification, equivalent replacement and improvement made within the principle of the present disclosure should be included in the scope of the present disclosure.

What is claimed is:

1. An interference suppression method, comprising:

calculating an angle range of a shaped beam from a first base station to a first terminal, and calculating an interference parameter of the first base station and a second base station;

determining whether the first terminal is a target terminal according to the angle range of the shaped beam and the interference parameters; and prohibiting, if the first terminal is the target terminal, the first base station from scheduling the first terminal.

2. The method of claim 1, wherein the calculating of the angle range of the shaped beam from the first base station to the first terminal comprises:

acquiring terminal position information of the first terminal;

calculating an angle of the shaped beam from the first base station to the first terminal according to the terminal position information; and calculating the angle range of the shaped beam from the first base station to the first terminal according to the angle of the shaped beam.

3. The method of claim 2, wherein the angle of the shaped beam comprises a Horizontal angle of Direction of Arrival (HDOA) and a Vertical angle of Direction of Arrival (VDOA), and the calculating of the angle range of the shaped beam from the first base station to the first terminal according to the angle of the shaped beam comprises:

acquiring a horizontal angle width beamWidthH and a vertical angle width beam WidthV of the shaped beam from the first base station;

calculating the angle range of the shaped beam from the first base station to the first terminal by the following formulae:

an angle range of the shaped beam in a horizontal dimension=[HDOA−beam WidthH/2, HDOA+beam WidthH/2], and an angle range of the shaped beam in a vertical dimension=[VDOA−beamWidth V/2, VDOA+beam Width V/2]; wherein the angle range of the shaped beam comprises a horizontal angle range and a vertical angle range of the shaped beam.

4. The method of claim 1, wherein the calculating of the interference parameter of the first base station and the second base station comprises:

generating an interference slot bitmap of the first base station and the second base station, and calculating a connection angle between the first base station and the second base station; and determining the interference slot bitmap and the connection angle as the interference parameter of the first base station and the second base station.

5. The method of claim 4, wherein calculating the connection angle between the first base station and the second base station comprises:

acquiring first position information of the first base station, and inquiring second position information of the second base station; and calculating the connection angle between the first base station and the second base station according to the first position information and the second position information, wherein the connection angle comprises a horizontal angle and a vertical angle.

6. The method of claim 4, wherein generating the interference slot bitmap of the first base station and the second base station comprises:

acquiring a first frame structure of the first base station, and inquiring a second frame structure of the second base station, wherein the first frame structure comprises a plurality of slots, the second frame structure comprises a plurality of slots, and a slot length of the first frame structure is the same as a slot length of the second frame structure;

analyzing the first frame structure and the second frame structure, and determining whether a downlink slot in the first frame structure overlaps an uplink slot in the second frame structure;

for each slot position, configuring, if a downlink slot in the first frame structure overlaps an uplink slot in the second frame structure, a first flag bit at a corresponding slot position in an initial slot bitmap, and configuring, if the downlink slot in the first frame structure does not overlap the uplink slot in the second frame structure, a second flag bit at the corresponding slot position in the initial slot bitmap, so as to obtain the interference slot bitmap of the first base station and the second base station.

7. The method of claim 1, wherein the interference parameter comprises an interference slot bitmap of the first base station and the second base station and the connection angle between the first base station and the second base station, and determining whether the first terminal is the target terminal according to the angle range of the shaped beam and the interference parameter comprises:

determining whether the connection angle is within the angle range of the shaped beam, and determining whether a downlink slot of the first base station corresponding to the first terminal in the interference slot bitmap is configured with a first flag bit, wherein the first flag bit is configured to represent that the downlink slot of the first base station overlaps an uplink slot of the second base station; and if the connection angle is within the angle range of the shaped beam and the downlink slot of the first base station corresponding to the first terminal in the interference slot bitmap is configured with the first flag bit, determining that the first terminal is the target terminal.

8. An interference suppression apparatus, wherein the interference suppression apparatus is configured to when executed by a processor, perform the method of claim 1.

9. A storage medium having a computer program stored therein, wherein the computer program is configured to perform, when executed, the method of claim 1.

10. An electronic device, comprising a memory having a computer program stored therein, and a processor configured to cause the computer program to perform the method of claim 1.

* * * * *